United States Patent

Harris et al.

Patent Number: 5,793,143
Date of Patent: Aug. 11, 1998

[54] ROTOR FOR AN ELECTRICAL MACHINE

[75] Inventors: Richard Kenneth Harris, Walled Lake; Michael Timothy York, Chelsea, both of Mich.

[73] Assignee: Ford Motor Company, Dearborn, Mich.

[21] Appl. No.: 906,548

[22] Filed: Aug. 5, 1997

[51] Int. Cl.$^6$ ............................ H02K 1/22; H02K 1/00
[52] U.S. Cl. .................................. 310/263; 310/181
[58] Field of Search ............................ 310/62, 63, 156, 310/261, 181, 263

[56] References Cited

U.S. PATENT DOCUMENTS

| | | | |
|---|---|---|---|
| 3,346,749 | 10/1967 | Shafranek | 310/263 |
| 3,411,027 | 11/1968 | Rosenberg | 310/181 |
| 3,555,327 | 1/1971 | Terry | 310/168 |
| 4,584,496 | 4/1986 | Frister | 310/60 R |
| 4,882,515 | 11/1989 | Radomski | 310/263 |
| 4,959,577 | 9/1990 | Radomski | 310/263 |
| 4,972,114 | 11/1990 | Frister | 310/263 |
| 4,980,595 | 12/1990 | Arora | 310/263 |
| 5,047,680 | 9/1991 | Torok | 310/156 |
| 5,130,595 | 7/1992 | Arora | 310/268 |
| 5,132,581 | 7/1992 | Kusase | 310/263 |
| 5,177,391 | 1/1993 | Kusase | 310/263 |
| 5,382,862 | 1/1995 | Ward et al. | 310/263 |

*Primary Examiner*—Clayton E. LaBalle
*Attorney, Agent, or Firm*—Mark S. Sparschu

[57] ABSTRACT

The present invention provides a rotor for an electrical machine. The rotor comprises first and second pole pieces defining an axis of rotation of the rotor. The first pole piece comprises a body and a plurality of pole fingers extending axially from the body of the first pole piece. The second pole piece comprises a body and a plurality of pole fingers extending axially from the body of the second pole piece, the pole fingers of the second pole piece intermeshed with the pole fingers of the first pole piece. The rotor also comprises a fan affixed for rotation with the first pole piece and the second pole piece, the fan having a plurality of pockets, each pocket containing a permanent magnet.

20 Claims, 3 Drawing Sheets

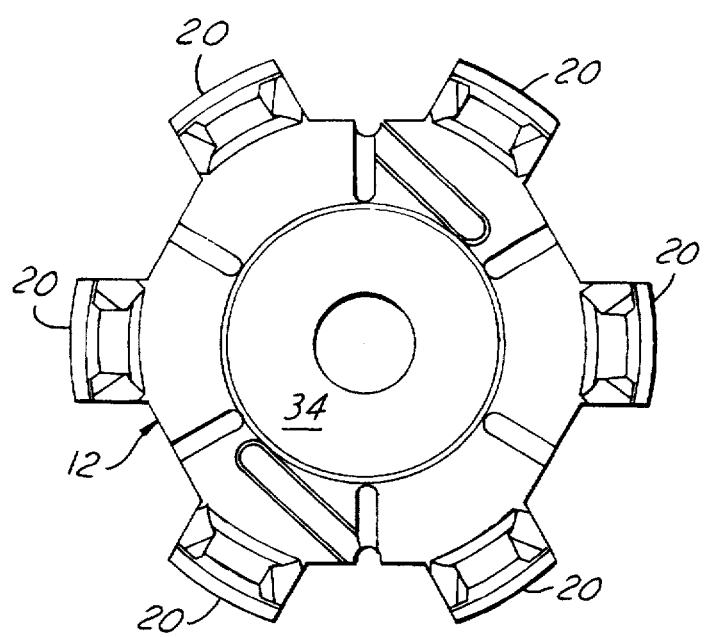
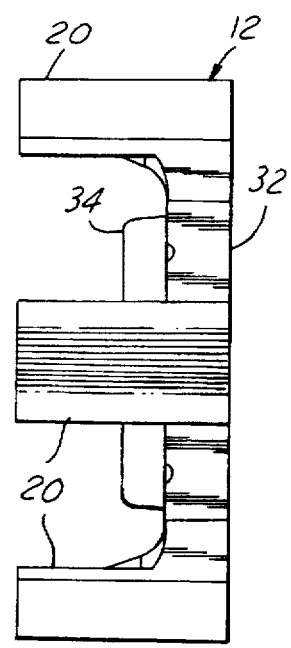
FIG.2A FIG.2B
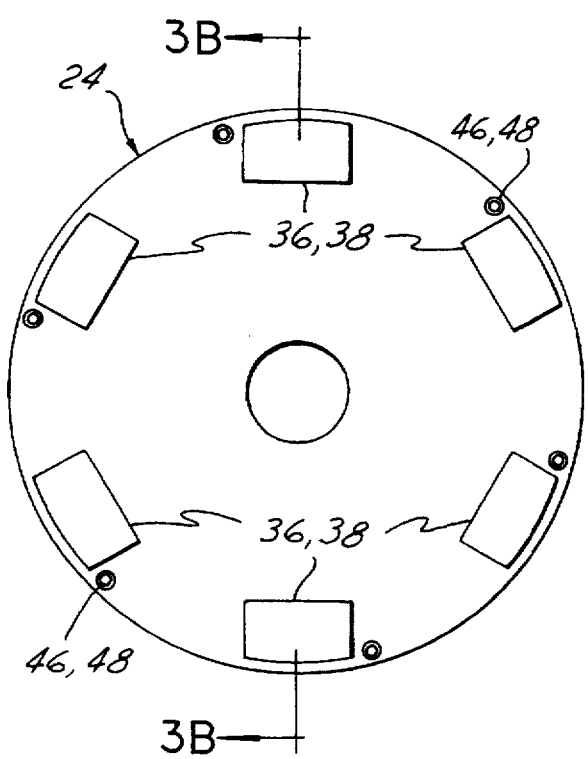
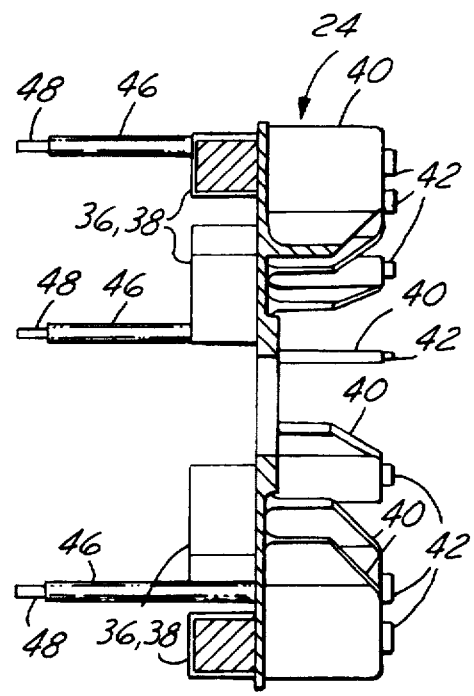
FIG.3A FIG.3B

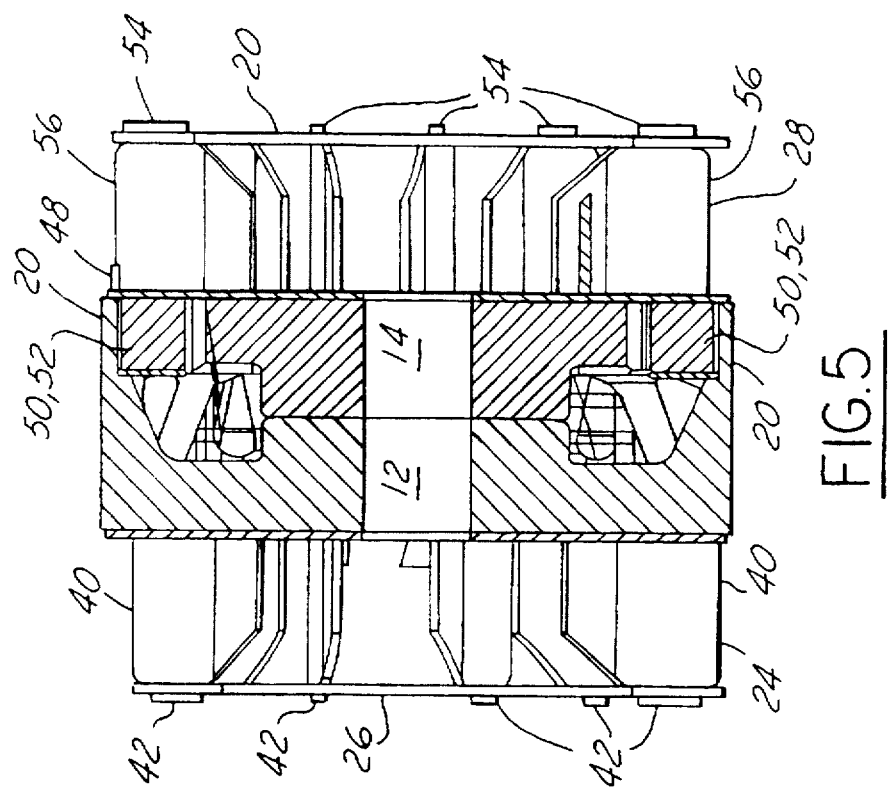
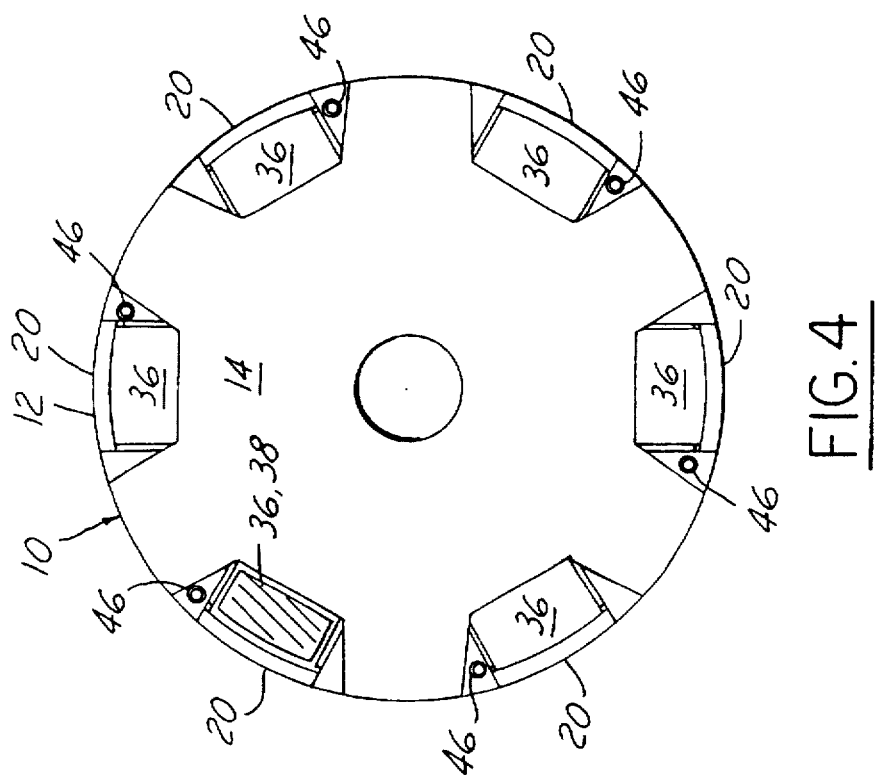

5,793,143

1

ROTOR FOR AN ELECTRICAL MACHINE

BACKGROUND OF THE INVENTION

1. Field of the Invention

The present invention relates generally to electrical machines and more specifically to rotors for electrical machines.

2. Description of the Related Art

Ways are continually being sought to increase the electrical output and efficiency of motor vehicle alternators. The long-standing standard in alternator design is a Lundell or "claw pole" alternator. Several documented designs have been proposed to add permanent magnets to the rotor of a Lundell alternator to increase electrical output. The design disclosed in our U.S. Pat. No. 5,543,676, issued Aug. 6, 1996, is one such design.

One challenge in adding permanent magnets to a Lundell rotor concerns securely mounting the magnets in a manner which will retain the magnets at the high speeds at which an alternator rotor rotates. Another challenge is in protecting the magnets from corrosion while in service in the rotor. Corrosion of permanent magnets is disadvantageous because it reduces the structural integrity and magnetic strength of the magnets. Yet a third challenge in adding permanent magnets to a Lundell rotor involves finding the highest efficiency with which to assemble the rotor, given that several more components are now involved. A fourth challenge involves assuring sufficient cooling for the alternator in light of the additional electrical output which is the goal of adding the permanent magnets in the first place.

Thus, a design which offers solutions to all of the above challenges can increase the practicality of a Lundell alternator with added permanent magnets. Such an alternator has the potential to provide higher efficiency and higher power density (power output per unit volume and weight of the alternator) than standard Lundell machines.

SUMMARY OF THE INVENTION

The present invention provides a rotor for an electrical machine. The rotor comprises first and second pole pieces defining an axis of rotation of the rotor. The first pole piece comprises a body and a plurality of pole fingers extending axially from the body of the first pole piece. The second pole piece comprises a body and a plurality of pole fingers extending axially from the body of the second pole piece, the pole fingers of the second pole piece intermeshed with the pole fingers of the first pole piece. The rotor also comprises a fan affixed for rotation with the first pole piece and the second pole piece, the fan having a plurality of pockets, each pocket containing a permanent magnet.

Rotors for electrical machines according to various embodiments of the present invention can include embedded permanent magnets and the increased power density and efficiency which the magnets can provide. Further, the design can securely hold the permanent magnets in place, protect against corrosion of the permanent magnets and be assembled with very high efficiency. Rotors according to the present invention can thus provide substantial advantages over alternative designs.

BRIEF DESCRIPTION OF THE DRAWINGS

FIGS. 2A and 2B are two views of pole piece 12 of rotor 10.

2

Figure 1:
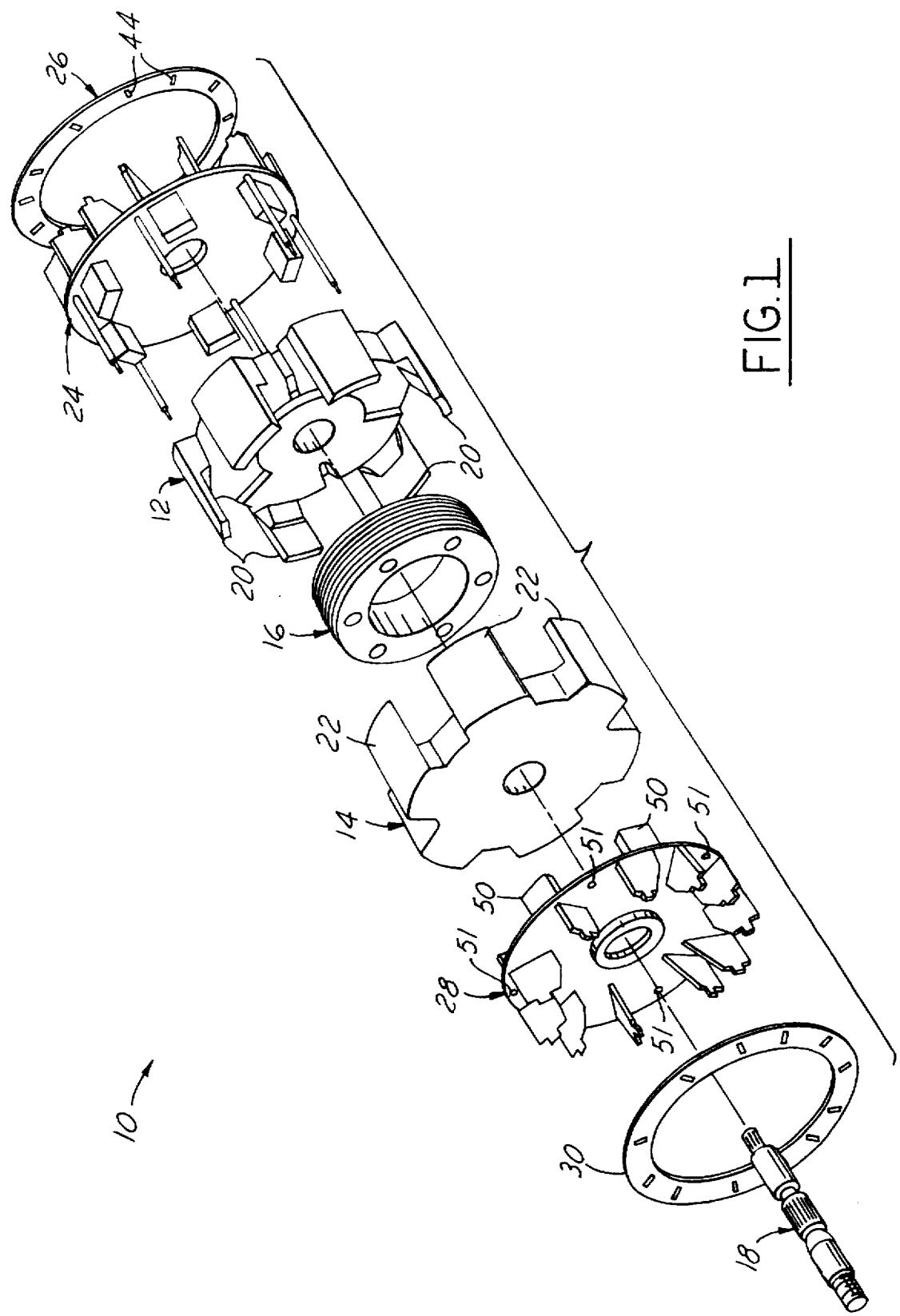
FIG. 1 is an exploded view of the relevant portions of a rotor 10 for an electrical machine, according to one embodiment of the present invention.

FIGS. 3A and 3B are two views of fan 24 of rotor 10.

FIG. 4 is an end view of rotor 10 with fan 28 and support member 30 removed.

FIG. 5 is a cross-sectional side view of rotor 10.

DETAILED DESCRIPTION OF THE PREFERRED EMBODIMENT

Refer first to FIG. 1, an exploded view of the relevant portions of a rotor 10 for an electrical machine. Those skilled in the art will recognize rotor 10 as being generally of the Lundell or "claw pole" type, used widely in motor vehicle alternators.

Rotor 10 includes a first pole piece 12, a second pole piece 14 and a field coil assembly 16. First pole piece 12 and second pole piece 14 are mounted on a shaft 18 and enclose field coil assembly 16. As rotor 10 is assembled, pole fingers 20 of first pole piece 12 are intermeshed with pole fingers 22 of second pole piece 14.

Rotor 10 further includes a first fan 24. Fan 24 is located at one axial end of the portion of rotor 10 containing pole pieces 12 and 14. Fan 24 is adjacent first pole piece 12. A support plate 26 bridges the tips of the blades of fan 24 to provide added support for the fan blades.

Rotor 10 also includes a second fan 28. Fan 28 is located at the opposite axial end of the portion of rotor 10 containing pole pieces 12 and 14. Fan 28 is adjacent second pole piece 14. A support plate 30 bridges the tips of the blades of fan 28 to provide added support for the fan blades.

Refer now additionally to FIGS. 2A and 2B. FIGS. 2A and 2B are two views of pole piece 12. Pole piece 12 is made of a ferromagnetic material and comprises a body 32 and six pole fingers 20 extending axially from body 32. Pole piece 12 also includes a hub 34 adapted to fit within field coil assembly 16.

Second pole piece 14 is preferably identical to first pole piece 12, to provide economies of scale in manufacturing pole pieces 12 and 14.

Refer now additionally to FIGS. 3A and 3B, two views of fan 24 of FIG. 1. Fan 24 is preferably molded of plastic. Fan 24 has six preferably enclosed pockets 36. Each pocket 36 contains an insert-molded permanent magnet 38. Permanent magnets 38 can be of any known permanent magnet material, including but not limited to ferrite and rare earth magnetic material. An advantage of designing pockets 36 to fully enclose magnets 38 is that magnets 38 are then protected from corrosion during service in rotor 10. Each pocket 36 is located so that when fan 24 is assembled into rotor 10, a pocket 36 is pressed under a pole finger 22 of second pole piece 14 and above body 32 of first pole piece 12. This is preferably a very snug or interference fit.

In an alternative construction of pockets 36, each pocket 36 can be molded with an opening allowing for insertion of a magnet 38. The pocket 36 can then be sealed with a potting material.

Fan 24 further includes a plurality of fan blades 40. Each fan blade 40 has a projection 42. Each projection 42 is designed to fit through a complementary opening 44 (see FIG. 1) in support plate 26. Support plate 26 is preferably stamped from metal but can be any material which provides added structural support to fan blades 40, particularly during high-speed rotation of rotor 10. After assembly of support plate 26 onto blades 40, projections 42 are preferably heat-staked to hold support plate 26 onto blades 40.

Fan 24 also includes a plurality of posts 46, each post terminating in a tip 48. In the assembled rotor 10, posts 46 span past pole pieces 12 and 14 to fan 28. Fan 28 is identical in all relevant respects to fan 24, except that fan 28 has complementary holes 51 (see FIG. 1) sized to accept tips 48 of posts 46. Once fans 24 and 26 are in place, with tips 48 of fan 24 protruding through the complementary holes in fan 28, tips 48 are heat-staked to fasten fan 24 to fan 28. Fans 24 and 28 are thus affixed for rotation with pole pieces 12 and 14. Fans 24 and 28 can be further affixed within rotor 10 to the respective pole pieces 12 and 14 by additional means, such as adhesive. Because fan 28 is coupled to integrally-formed posts 46 of fan 24, fans 24 and 28 can be said to be directly coupled together.

As has been noted, fan 28 is identical in all relevant respects to fan 24 but for the provision of complementary holes for insertion of tips 48 of posts 46 of fan 24. Accordingly, like fan 24, fan 28 has six pockets 50 (see FIG. 1) which each enclose a permanent magnet. In the assembly of rotor 10, each pocket of fan 28 is pressed under a pole finger 20 of first pole piece 12 and above the body of second pole piece 14. Again, this is preferably a very snug or interference fit.

Refer now additionally to FIG. 4. FIG. 4 is an end view of rotor 10 with fan 28 and support plate 30 removed for ease in further illustrating rotor 10. In FIG. 4, one pocket 36 is shown in cross-section to reveal the permanent magnet 38 disposed within. FIG. 4 also illustrates the locations where posts 46 of fan 24 are routed through rotor 10 for subsequent attachment to fan 28. FIG. 4 illustrates the location of each pocket 36 of fan 24 between a pole finger 20 of pole piece 12 and the body of pole piece 14.

Refer now additionally to FIG. 5, a cross-sectional side view of rotor 10, with shaft 18 removed for aid in illustration. Visible in FIG. 5 are two pockets 50 of fan 28, with their associated permanent magnets 52 enclosed within. Also visible in FIG. 5 is a tip 48 of a post 46 of fan 24. As was discussed above, the tips 48 are heat-staked to fasten fans 24 and 28 together and to help affix them for rotation with pole pieces 12 and 14. FIG. 5 also illustrates some of the projections 42 of the blades 40 of fan 24 and some of the projections 54 of the blades 56 of fan 28. Projections 42 and 54 are heat staked to the respective support plates 26 and 30 of fans 24 and 28. FIG. 5 shows tip 48 and projections 42 and 54 prior to heat-staking.

An alternative design for pole pieces 12 and 14 can also be employed. The pole fingers of those pole pieces can be tapered to a reduced lateral dimension at their tips (like a more conventional Lundell rotor). Also, the lateral edges of the pole fingers can be beveled. Such an alternative design for pole pieces 12 and 14 may have the benefit of reducing audible noise when the rotor rotates.

Rotors such as the embodiments of rotor 10 disclosed herein provide many advantages when employed in an electrical machine. First, provision of the permanent magnets provides substantially increased power density and efficiency when compared to standard Lundell rotors. Second, the location of the permanent magnets beneath the ends of the pole fingers of pole pieces 12 and 14 provides the added benefit of allowing the pole fingers of each pole piece 12 and 14 to extend over the body of the other pole piece, reducing the overall length of rotor 10. In a typical Lundell rotor, this configuration would cause considerable electromagnetic flux leakage from the pole fingers of one pole piece to the body of the other pole piece. However, the permanent magnets as located in this disclosure greatly reduce or prevent such leakage.

Yet another advantage of the present design is that alternators containing rotors of the design described herein have been shown to provide their increased electrical output with control accomplished by a conventional unidirectional voltage regulator. Other designs where permanent magnets are employed in alternator rotors frequently require a voltage regulator which controls current bi-directionally through the rotor's field coil to "buck" the field produced by the permanent magnets at high rotor speed. Bi-directional voltage regulators add cost and complexity over conventional unidirectional voltage regulators.

A further advantage of the rotor design disclosed herein is in the corrosion resistance provided to the permanent magnets by encapsulating them within the pockets of fans 24 and 28. Additionally, support plates 26 and 30 for fans 24 and 28 allow the blades of fans 24 and 28 to be made relatively tall and have considerable structural integrity, even at high rotational speeds of rotor 10. The tall fan blades increase cooling airflow for rotor 10 and for the stator (not shown) of the machine containing rotor 10. Providing support plates 26 and 30 as separate parts from fans 24 and 28 allows significant flexibility in molding fans 24 and 28. Including support plates 26 and 30 as integrally formed with fans 24 and 28 would considerably constrain the ability to mold fans 24 and 28.

Additional advantages of this embodiment of the present invention are secure retention of the permanent magnets within the pockets of fans 24 and 28 and the increased assembly efficiency of the rotor when the permanent magnets are located within the pockets of fans 24 and 28.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

We claim:

1. A rotor for an electrical machine, said rotor comprising:
   first and second pole pieces defining an axis of rotation of said rotor;
   said first pole piece comprising a body and a plurality of pole fingers extending axially from said body of said first pole piece;
   said second pole piece comprising a body and a plurality of pole fingers extending axially from said body of said second pole piece, said pole fingers of said second pole piece intermeshed with said pole fingers of said first pole piece;
   a fan affixed for rotation with said first pole piece and said second pole piece, said fan having a plurality of pockets, each pocket containing a permanent magnet.

2. A rotor as recited in claim 1, wherein:
   each said pole finger of said first pole piece has an end; and
   each said pocket extends under a said end of a said pole finger of said first pole piece.

3. A rotor as recited in claim 1, wherein:
   said body of said first pole piece has a plurality of radially-outwardly-opening recesses, each recess located between a consecutive pair of pole fingers of said first pole piece; and
   each pocket extends into one of said recesses.

4. A rotor as recited in claim 1, wherein said pockets are integral with said fan.

5. A rotor as recited in claim 1, wherein said pockets are integral with said fan and substantially enclose said permanent magnets.

6. A rotor as recited in claim 1, wherein said pockets are sealed with potting material.

7. A rotor as recited in claim 1, further comprising a second fan affixed for rotation with said first pole piece and said second pole piece, said second fan having a plurality of pockets, each pocket of said second fan containing a permanent magnet.

8. A rotor as recited in claim 7, wherein:

said fan is located adjacent said first pole piece;

said second fan is located adjacent said second pole piece; and said fan and said second fan are directly coupled together.

9. A rotor as recited in claim 8, wherein said fan comprises integral axially-extending projections coupled to said second fan.

10. A rotor as recited in claim 9, wherein said axially-extending projections extend through complementary openings in said second fan.

11. A rotor as recited in claim 2, wherein said ends of said pole fingers of said first pole piece extend over said body of said second pole piece.

12. A rotor as recited in claim 11, wherein each said pocket of said fan extends between a said end of a said pole finger of said first pole piece and said body of said second pole piece.

13. A rotor as recited in claim 11, wherein each said pocket of said fan is interference fit between a said end of a said pole finger of said first pole piece and said body of said second pole piece.

14. A rotor as recited in claim 12, wherein said pockets are integral with said fan and substantially enclose said permanent magnets.

15. A rotor as recited in claim 8, wherein:

said fan comprises fan blades extending axially outward from said rotor, each said fan blade having a tip; and said fan further comprises a support member fastened to and bridging said tips of said fan blades.

16. A rotor as recited in claim 15, wherein each said fan blade tip includes a projection projecting through said support member.

17. A rotor as recited in claim 16, wherein said support member is a substantially annular plate.

18. A rotor as recited in claim 1, wherein said fan further comprises:

fan blades extending axially outward from said rotor, each said fan blade having a tip; and a support member fastened to and bridging said tips of said fan blades.

19. A rotor as recited in claim 18, wherein each said fan blade tip includes a projection projecting through said support member.

20. A rotor as recited in claim 19, wherein said support member is a substantially annular plate.

* * * * *